United States Patent
Mashimo et al.

(10) Patent No.: US 12,275,411 B2
(45) Date of Patent: *Apr. 15, 2025

(54) ELECTRONIC CONTROL APPARATUS, CONTROL METHOD, AND AUTOMATED DRIVING SYSTEM

(71) Applicant: Hitachi Astemo, Ltd., Hitachinaka (JP)

(72) Inventors: Daisuke Mashimo, Tokyo (JP); Keisuke Ampo, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 286 days.

This patent is subject to a terminal disclaimer.

(21) Appl. No.: 17/802,216

(22) PCT Filed: Feb. 24, 2021

(86) PCT No.: PCT/JP2021/006800
§ 371 (c)(1),
(2) Date: Aug. 25, 2022

(87) PCT Pub. No.: WO2021/177092
PCT Pub. Date: Sep. 10, 2021

(65) Prior Publication Data
US 2023/0077342 A1 Mar. 16, 2023

(30) Foreign Application Priority Data

Mar. 4, 2020 (JP) .................... 2020-036691

(51) Int. Cl.
*B60W 30/182* (2020.01)
*B60W 40/02* (2006.01)
(Continued)

(52) U.S. Cl.
CPC .......... *B60W 30/182* (2013.01); *B60W 40/02* (2013.01); *B60W 60/001* (2020.02);
(Continued)

(58) Field of Classification Search
CPC ........ H04W 4/44; H04W 4/02; G08G 1/0968; G08G 1/16; G08G 1/09; G01C 21/26;
(Continued)

(56) References Cited

U.S. PATENT DOCUMENTS 10,228,696 B2 * 3/2019 Myers ................... B60W 50/14
10,981,495 B2 * 4/2021 Kusayanagi .......... B60W 30/08
(Continued)

FOREIGN PATENT DOCUMENTS

CN      110506194 A     11/2019
JP    2017-215653 A     12/2017
(Continued)

OTHER PUBLICATIONS

Horita et al., Extended electronic horizon for automated driving, 2015, IEEE, p. 32-36 (Year: 2015).*
(Continued)

*Primary Examiner* — McDieunel Marc
(74) *Attorney, Agent, or Firm* — Crowell & Moring LLP

(57) ABSTRACT

An electronic control device apparatus includes a storage apparatus, a communication apparatus, and a processing apparatus. The processing apparatus determines, based on the level of the shape data included in external map information acquired by the communication apparatus, one of the plurality of control modes with different control methods of the vehicle as the control mode of the autonomous driving control.

9 Claims, 17 Drawing Sheets

(51) Int. Cl.
*B60W 60/00* (2020.01)
*H04W 4/44* (2018.01)

(52) U.S. Cl.
CPC .......... *H04W 4/44* (2018.02); *B60W 2556/40* (2020.02); *B60W 2556/50* (2020.02)

(58) Field of Classification Search
CPC .. B60W 60/001; B60W 40/02; B60W 30/182; B60W 2556/50; B60W 2556/40
See application file for complete search history.

(56) References Cited

U.S. PATENT DOCUMENTS

| | | | | |
|---|---|---|---|---|
| 11,270,589 | B2* | 3/2022 | Shimizu | B60K 35/00 |
| 11,511,667 | B2* | 11/2022 | Shimizu | B60R 1/27 |
| 11,780,468 | B2* | 10/2023 | Yamaguchi | G08G 1/09626 |
| | | | | 701/23 |
| 2018/0113460 | A1 | 4/2018 | Koda et al. | |
| 2020/0056894 | A1 | 2/2020 | Kawabata | |
| 2020/0096355 | A1 | 3/2020 | Mishina et al. | |
| 2020/0264610 | A1 | 8/2020 | Tanaka | |
| 2020/0398864 | A1* | 12/2020 | Yamaguchi | B60W 60/0017 |
| 2022/0324478 | A1* | 10/2022 | Mashimo | H04W 4/44 |

FOREIGN PATENT DOCUMENTS

| | | |
|---|---|---|
| JP | 2018-96743 A | 6/2018 |
| JP | 2019-45940 A | 3/2019 |
| JP | 2020-8681 A | 1/2020 |
| WO | WO 2016/152873 A1 | 9/2016 |
| WO | WO 2019/065429 A1 | 4/2019 |

OTHER PUBLICATIONS

Okamoto et al., A method of structuring communication data for in-vehicle information service, 2010, IEEE, p. 144-151 (Year: 2010).*

Zhang et al., Mobile Edge Intelligence and Computing for the Internet of Vehicles, 2019, IEEE, p. 246-261 (Year: 2019).*

Wang et al., Multi-Sensor Fusion in Automated Driving: A Survey, 2019, IEEE, p. 2847-2868 (Year: 2019).*

International Search Report (PCT/ISA/210) issued in PCT Application No. PCT/JP2021/006800 dated May 18, 2021 with English translation (four (4) pages).

Japanese-language Written Opinion (PCT/ISA/237) issued in PCT Application No. PCT/JP2021/006800 dated May 18, 2021 (three (3) pages).

Chinese-language Office Action issued in Chinese Application No. 202180018733.6 dated Jan. 4, 2024 with English translation (13 pages).

* cited by examiner

FIG. 5A

| MAXIMUM CURVATURE k | k<0.005 | 0.005≤k<0.01 | 0.01≤k |
|---|---|---|---|
| TRAVEL DIFFICULTY LEVEL SCORE | 0 | 10 | 20 |

| LEFT OR RIGHT TURN AT INTERSECTION | NO TURN | MAKE TURN |
|---|---|---|
| TRAVEL DIFFICULTY LEVEL SCORE | 0 | 20 |

| WEATHER FORECAST | SUNNY | CLOUDY | RAINY | SNOWY |
|---|---|---|---|---|
| TRAVEL DIFFICULTY LEVEL SCORE | 4 | 0 | 10 | 20 |

| TOTAL TRAVEL DIFFICULTY LEVEL SCORE | 0 TO 9 | 10 TO 20 | MORE THAN 20 |
|---|---|---|---|
| TRAVEL DIFFICULTY LEVEL | 1 | 2 | 3 |

| DETAILEDNESS LEVEL \ TRAVEL DIFFICULTE L | 1 | 2 | 3 |
|---|---|---|---|
| 3 | 3 | 3 | 2 |
| 2 | 3 | 2 | 1 |
| 1 | 2 | 1 | 0 |

| CONTROL MODE ID | CONTROL MODE |
|---|---|
| 0 | MANUAL DRIVING |
| 1 | LANE FOLLOWING TRAVEL (MAXIMUM SPEED: 60km/h) |
| 2 | LANE FOLLOWING TRAVEL (MAXIMUM SPEED: 80km/h) |
| 3 | MULTI-LANE TRAVEL (MAXIMUM SPEED: 100km/h) |

501 502 500

ELECTRONIC CONTROL APPARATUS, CONTROL METHOD, AND AUTOMATED DRIVING SYSTEM

TECHNICAL FIELD

The present invention relates to an electronic control device, a control method, and an automated driving system.

BACKGROUND ART

In recent years, expectations for automated driving vehicles have increased in order to realize a safe and secure transportation society, and technological development has been made in various countries around the world. The automated driving vehicle recognizes a surrounding situation in real time using information of a sensor such as a camera or a radar mounted on the vehicle, determines a control method according to the recognized information, and performs an operation of the vehicle based on the determination information, thereby implementing automated driving. In addition, highly accurate map information is used for the purpose of complementing recognition processing based on sensor information in such automated driving. The map information includes, for example, attributes such as centerline information, curvature, and gradient information on a road basis and a lane basis, and geographic feature information such as a sign and a signal. The map information is used to acquire information that cannot be acquired by the sensor for automated driving control and improve the accuracy of information acquired by the sensor, and plays a major role in improving the continuity and stability of the automated driving function.

PTL 1 discloses an automated driving support device that performs automated driving based on an output of a sensor unit that acquires information on the surrounding of a vehicle or information regarding a state of the vehicle, the automated driving support device including: a first acquisition unit that acquires or stores first information regarding a surrounding information acquisition unit that acquires the information on the surrounding of the vehicle or the information regarding the state of the vehicle; a second acquisition unit that acquires second information regarding a road in a predetermined section; and a determination unit that determines a degree of a function regarding the automated driving that can be implemented by the vehicle in the predetermined section for each function of the automated driving based on the first information and the second information.

CITATION LIST

Patent Literature

PTL 1: WO 16/152873

SUMMARY OF INVENTION

Technical Problem

In the invention described in PTL 1, in a case where map data is acquired from a server device that performs communication via a network, processing in a case where the map data cannot be acquired due to a communication situation is not described and thus, it is not possible to deal with such a situation. In addition, in a case where map data of all road sections is stored in advance in the automated driving support device, device cost increases due to an increase in required storage capacity.

Solution to Problem

An electronic control device according to a first aspect of the present invention includes: a storage unit that stores basic map data; a communication unit that communicates with a data center to acquire map data managed by the data center as external map data; and a processing unit that determines a control mode of automated driving control according to the acquired external map data, and performs the automated driving control based on the determined control mode, position information of a vehicle, the basic map data, and the external map data.

A control method according to a second aspect of the present invention executed by an electronic control device that is mounted on a vehicle and performs automated driving control using map information includes: communicating, by the electronic control device, with a data center to acquire map data managed by the data center as external map data; determining, by the electronic control device, a control mode of the automated driving control according to the acquired external map data; and performing, by the electronic control device, the automated driving control based on the determined control mode, position information of the vehicle, basic map data stored in a storage unit of the electronic control device, and the external map data.

An automated driving system according to a third aspect of the present invention includes: an electronic control device that is mounted on a vehicle and performs automated driving control using map information; and a data center that communicates with the electronic control device via wireless communication, in which the electronic control device includes: a storage unit that stores basic map data; a communication unit that communicates with the data center to acquire map data managed by the data center as external map data; and a processing unit that determines a control mode of the automated driving control according to the acquired external map data, and performs the automated driving control based on the determined control mode, position information of the vehicle, the basic map data, and the external map data.

Advantageous Effects of Invention

According to the present invention, it is possible to secure the availability of the map information and improve the continuity of the automated driving function even in a case where a communication situation is not good while the required storage capacity is suppressed by limiting the map information stored in the vehicle.

The above problems, configurations, and effects will be clarified by the following description of embodiments.

BRIEF DESCRIPTION OF DRAWINGS

FIG. 5A is a diagram illustrating an example of a score determination table (Part 1).

FIG. 5B is a diagram illustrating an example of the score determination table (Part 2).

FIG. 5C is a diagram illustrating an example of the score determination table (Part 3).

FIG. 6 is a diagram illustrating an example of a travel difficulty level calculation table.

FIG. 9 is a diagram illustrating an example of a control mode determination table.

FIG. 10 is a diagram illustrating an example of a control mode management table.

DESCRIPTION OF EMBODIMENTS

Hereinafter, embodiments will be described with reference to the drawings.

First Embodiment

Hereinafter, an automated driving system according to a first embodiment of the present invention will be described with reference to FIGS. 1 to 15.

Figure 1:
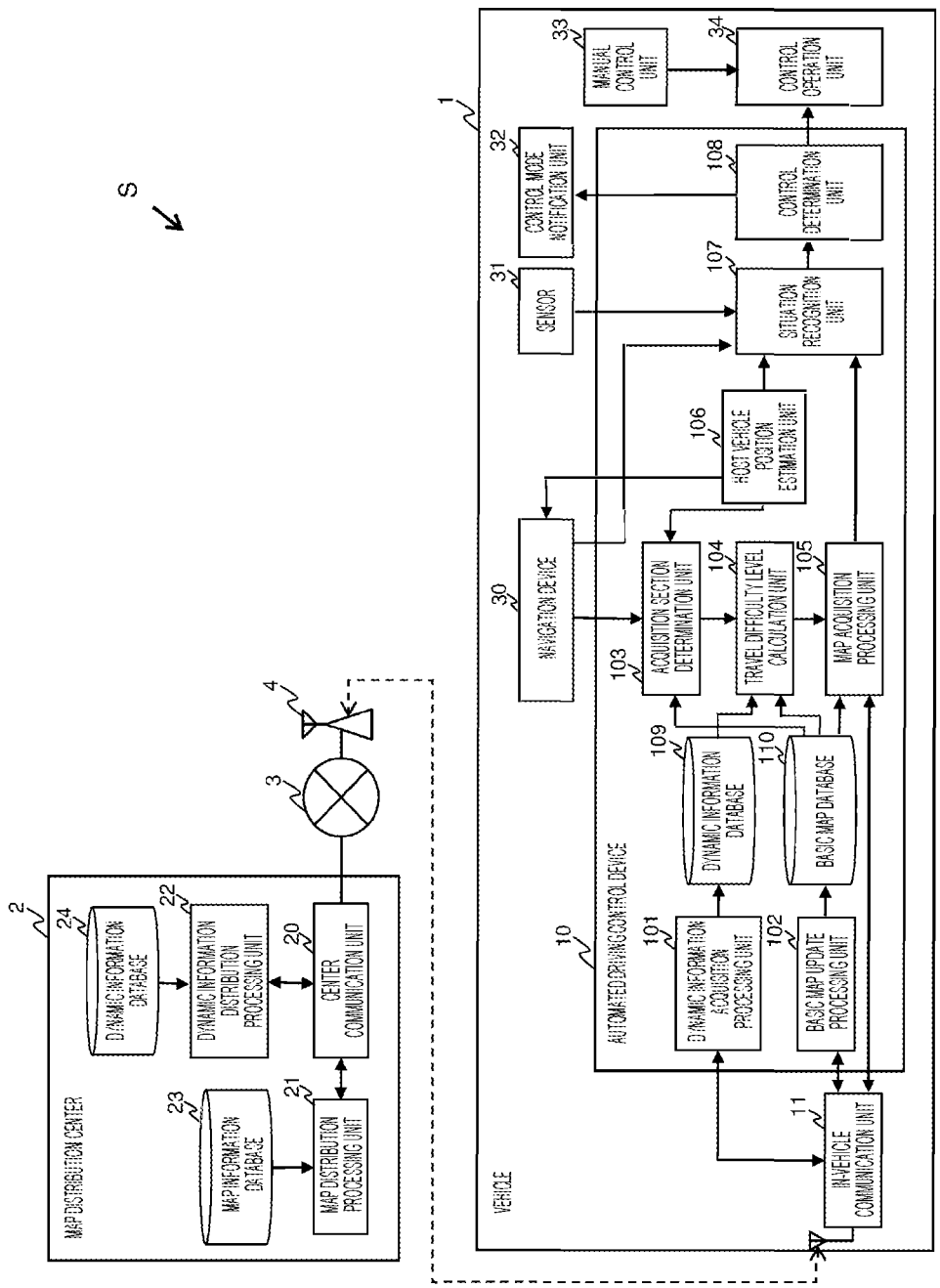
FIG. 1 is a configuration diagram of an automated driving system according to a first embodiment.

FIG. 1 is a configuration diagram of an automated driving system S. The automated driving system S includes a map distribution center 2 and one or more vehicles 1. The vehicle 1 is connected to the map distribution center 2 via a wireless base station 4 and a network 3. The vehicle 1 performs automated driving while acquiring map information from the map distribution center 2. That is, the vehicle 1 is an automated driving vehicle.

The vehicle 1 includes an in-vehicle communication unit 11, an automated driving control device 10, a navigation device 30, a sensor 31, a control mode notification unit 32, a manual control unit 33, and a control operation unit 34.

The in-vehicle communication unit 11 is, for example, a wireless communication module including a wireless interface for connection with the wireless base station 4. The in-vehicle communication unit 11 processes a communication protocol and transmits and receives data to and from the map distribution center 2.

The automated driving control device 10 includes a dynamic information acquisition processing unit 101, a basic map update processing unit 102, an acquisition section determination unit 103, a travel difficulty level calculation unit 104, a map acquisition processing unit 105, a host vehicle position estimation unit 106, a situation recognition unit 107, a control determination unit 108, a dynamic information database 109, and a basic map database 110. These are implemented by a central processing unit (CPU) which is a central processing device, a read-only memory (ROM) which is a read-only storage device, and a random access memory (RAM) which is a readable/writable storage device. However, the CPU, the ROM, and the RAM are not illustrated in FIG. 1. Specifically, the CPU implements these functions by loading a program stored in the ROM to the RAM and executing the program. However, all or some of the dynamic information acquisition processing unit 101 and the like may be implemented by a field programmable gate array (FPGA) which is a rewritable logic circuit and an application specific integrated circuit (ASIC) instead of a combination of the CPU, the ROM, and the RAM. Furthermore, the dynamic information acquisition processing unit 101 and the like may be implemented by a different combination, for example, a combination of the CPU, the ROM, the RAM, and the FPGA, instead of the combination of the CPU, the ROM, and the RAM.

The dynamic information acquisition processing unit 101 acquires dynamic information from the map distribution center 2 and stores the dynamic information in the dynamic information database 109. The dynamic information is information that dynamically changes according to a time point, such as a weather forecast, traffic congestion prediction, and a sunshine direction, and is stored in association with information indicating a position in the map information. The dynamic information is acquired, for example, by the dynamic information acquisition processing unit 101 periodically transmitting a dynamic information request to the map distribution center 2.

The basic map update processing unit 102 acquires update data for basic map information from the map distribution center 2, and performs update processing for the basic map information stored in the basic map database 110. The update data is acquired by transmitting a request to the map distribution center 2 from the basic map update processing unit 102, for example, at the time of starting the vehicle.

The basic map information includes connection information of roads, lanes, and the like, shape data of roads, lanes, geographic features, and the like, and metadata regarding road shapes or road attributes, for all roads on which the vehicle 1 performs automated driving. The shape data is a set of coordinate points representing a shape and connection information thereof, and the shape data of the map information used in the automated driving system is used by hierarchically dividing the most detailed shape data of a base map that the map distribution center 2 has into the basic map information and one or more pieces of detailed map information. The number of coordinate points of the shape data of the basic map information is limited in such a way as to be able to provide a detailedness level at which the vehicle 1 can execute any of executable control modes. This basic map information corresponds to basic map data in the claims. The detailed map information will be described later.

The acquisition section determination unit 103 receives travel route information from the navigation device 30, receives host vehicle position information from the host vehicle position estimation unit 106, specifies an acquisition section and an acquisition timing of the detailed map information acquired when the vehicle is traveling from the map distribution center 2 by referring to the basic map information stored in the basic map database 110 based on the received travel route information and host vehicle position information, and notifies the travel difficulty level calculation unit 104 of target acquisition section information. The acquisition section information includes information indicating an acquisition order in units of sections. As for the acquisition order in units of sections, for example, a section closer to the position of a host vehicle at the time of specifying the acquisition section has a higher priority in acquisition.

Figure 2A:
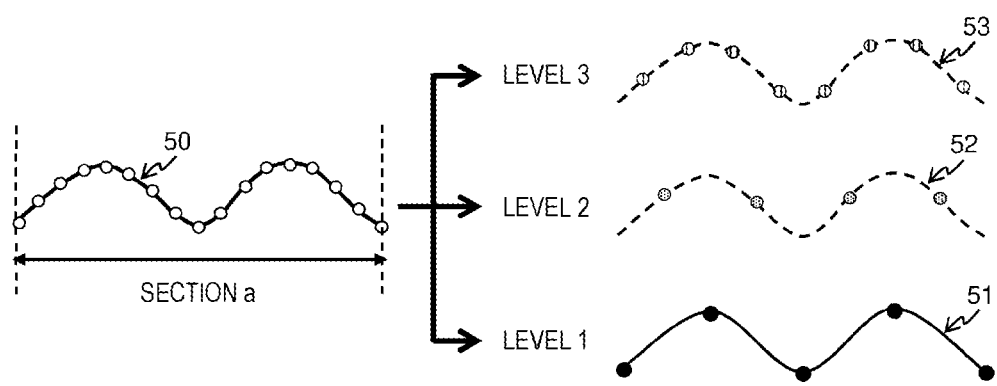
FIG. 2A illustrates an example of shape data of basic map information and shape data of detailed map information (Part 1).
Figure 2B:
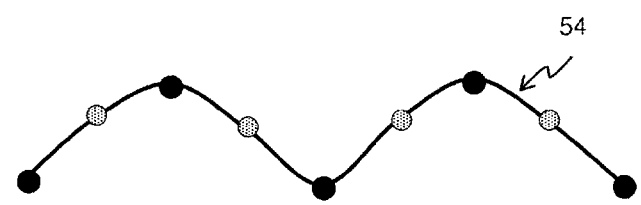
FIG. 2B illustrates an example of the shape data of the basic map information and the shape data of the detailed map information (Part 2).
Figure 2C:
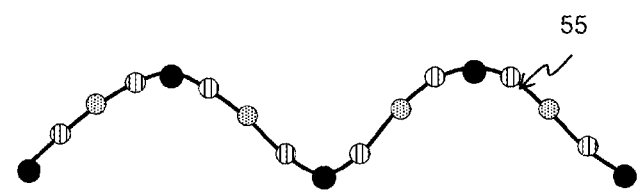
FIG. 2C illustrates an example of the shape data of the basic map information and the shape data of the detailed map information (Part 3).

The detailed map information includes coordinate points that are not included in the shape data of the basic map information, and includes shape data capable of generating shape data having a higher detailedness level than the basic map information by being combined with the shape data of the basic map information. Further, the detailed map information may include metadata regarding road shapes or road attributes. This detailed map information corresponds to external map data in the claims. The detailed map information is divided into one or more levels, and the basic map information and the shape data included in the detailed map information of each level include different coordinate points. FIG. 2A illustrates an example of the shape data of the basic map information and the shape data of the detailed map information. This example shows that shape data 51 of the basic map information and shape data 52 and shape data 53 of the detailed map information of two levels are present in a section a. Shape data including a limited number of coordinate points unlike shape data 50 of the base map of the map distribution center 2 is stored in the basic map database as the shape data 51 of the basic map information. Hereinafter, the shape data of the basic map information is referred to as level-1 shape data, and the detailedness level of the shape data is 1. In addition, the shape data 52 and the shape data 53 of the detailed map information are referred to as level-2 shape data and level-3 shape data, respectively, and the pieces of detailed map information including the level-2 shape data and the level-3 shape data are referred to as level-2 detailed map information and level-3 detailed map information, respectively. It is possible to generate shape data with a high detailedness level as compared with a case where the data is not used, by combining the data with all pieces of shape data whose level is lower than that of the data. That is, the vehicle 1 acquires the shape data from the map distribution center 2 in order from the lower-level shape data. By combining the level-1 shape data with the level-2 shape data, it is possible to generate shape data 54 with a higher detailedness level as illustrated in FIG. 2B. The detailedness level of the shape data 54 is 2. Further, by combining the level-3 shape data, it is possible to generate shape data 55 with a higher detailedness level as illustrated in FIG. 2C. The detailedness level of the shape data 55 is 3.

Figure 3:
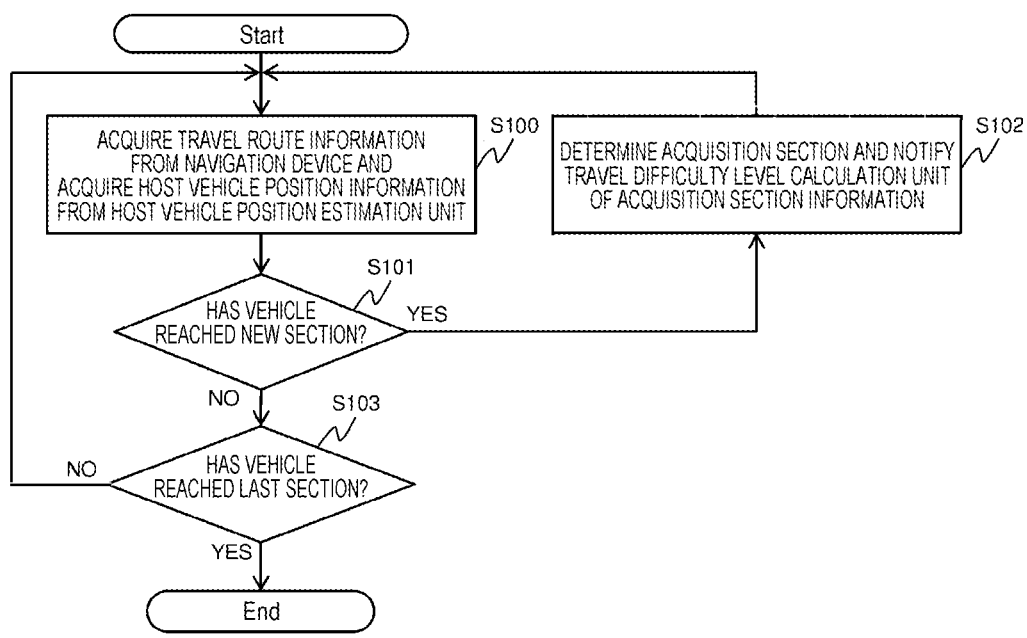
FIG. 3 is a flowchart illustrating processing performed by an acquisition section determination unit.

FIG. 3 is a flowchart illustrating processing performed by the acquisition section determination unit 103. First, the acquisition section determination unit 103 periodically acquires the travel route information from the navigation device 30. The travel route information indicates a part of a travel route from the position of the host vehicle indicated by the host vehicle position information acquired by the navigation device 30 from the host vehicle position estimation unit 106 to a destination. Further, the acquisition section determination unit 103 periodically acquires the host vehicle position information from the host vehicle position estimation unit 106 (S100). Then, the acquisition section determination unit 103 determines whether or not the vehicle has reached a start point of each section by referring to the basic map database 110 based on the host vehicle position information, and determines whether or not it is necessary to determine a target section of the detailed map information acquired from the map distribution center 2 for the section. Here, for example, it is assumed that the section is obtained by dividing a road on a planned travel route for each certain distance from a start point of traveling for which a destination is set in the navigation device 30 (S101). Then, in a case where the acquisition section determination unit 103 determines that the vehicle has reached a new section, the acquisition section determination unit 103 determines the acquisition section of the detailed map information to be acquired from the map distribution center 2 when the vehicle travels in the section by referring to the basic map database based on the travel route information, creates the acquisition section information including the determined acquisition section and the acquisition order of the acquisition section, and notifies the travel difficulty level calculation unit 104 of the acquisition section information. The acquisition section includes, for example, a section next to a section in which the vehicle is currently traveling and a section next to the next section (S102). In a case where it is determined that the vehicle has reached the last section including the destination, the processing ends (S103).

The travel difficulty level calculation unit 104 receives the acquisition section information from the acquisition section determination unit 103, calculates a travel difficulty level by referring to the dynamic information database 109 and the basic map database 110 based on the section indicated by the received acquisition section information, and notifies the map acquisition processing unit 105 of the acquisition section information and the travel difficulty level information.

Figure 4:
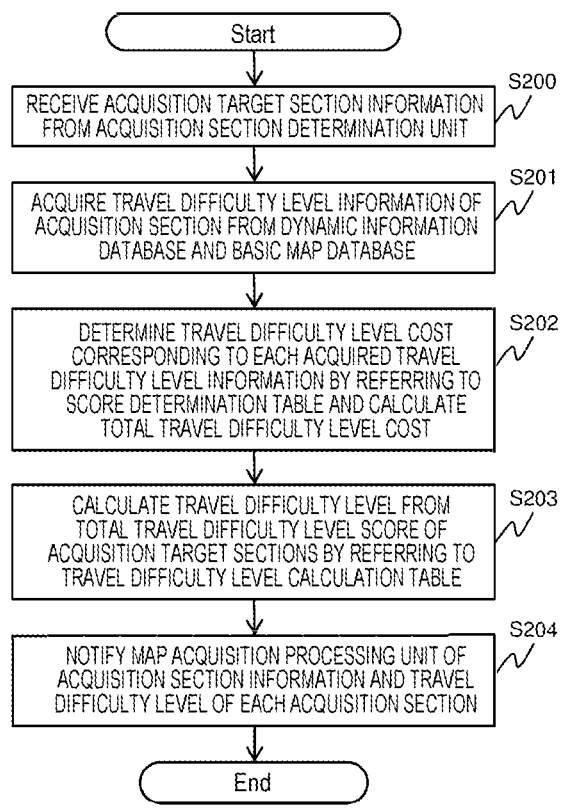
FIG. 4 is a flowchart illustrating processing performed by a travel difficulty level calculation unit.

FIG. 4 is a flowchart illustrating processing performed by the travel difficulty level calculation unit 104. Once the acquisition section information is received from the acquisition section determination unit 103, the travel difficulty level calculation unit 104 starts the processing (S200). Once the acquisition section information is received, the travel difficulty level information corresponding to the acquisition section indicated by the acquisition section information is acquired from the dynamic information database 109 and the basic map database 110. The travel difficulty level information is information for calculating the travel difficulty level indicating the difficulty level of automated driving in the acquisition section, and includes metadata regarding one or more road shapes or road attributes for the acquisition section, travel information such as right or left turn and diverging/merging during traveling in the section, and dynamic information such as a weather forecast and traffic congestion prediction. In a case where a plurality of pieces of travel difficulty level information to be used can be acquired for the traveling section, information with the highest travel difficulty level score to be described below is acquired (S201). Then, the travel difficulty level calculation unit 104 determines the travel difficulty level score by referring to a score determination table that is held by the travel difficulty level calculation unit 104 and indicates the travel difficulty level score according to the travel difficulty level information, based on the acquired travel difficulty level information, and calculates the total travel difficulty level score. FIGS. 5A, 5B, and 5C illustrate examples of a score determination table 200 in a case of calculation using a maximum curvature, right or left turn at an intersection, and weather forecast information as the travel difficulty level information. For example, in a case where the maximum curvature of the section is 0.007, no right or left turn is made at the intersection, and the weather forecast is sunny, the travel difficulty level scores corresponding thereto are 10, 0, and 4, respectively, and the total travel difficulty level score is calculated as 14 (S202). Next, the travel difficulty level of the section is determined by referring to a travel difficulty level calculation table that is held by the travel difficulty level calculation unit 104 and indicates the travel difficulty level corresponding to the total travel difficulty level score based on the total travel difficulty level score. FIG. 6 is an example of a travel difficulty level calculation table 300. According to the above example, since the total travel difficulty level score is 14, the travel difficulty level is calculated as 2 (S203). Finally, the map acquisition processing unit 105 is notified of the acquisition section information received from the acquisition section determination unit 103 and the travel difficulty level of each acquisition section, and the processing ends (S204). As the travel difficulty level information, the metadata regarding road shapes or road attributes such as the presence or absence of a gradient or a blind curve, and dynamic information such as traffic congestion prediction or a sunshine direction may be used.

Once the acquisition section information and the travel difficulty level of each acquisition section are received from the travel difficulty level calculation unit 104, the map acquisition processing unit 105 acquires the basic map information of each acquisition section from the basic map database 110, holds the acquired basic map information, and transmits the basic map information to the situation recognition unit 107. Further, the map acquisition processing unit 105 determines the acquisition order of the detailed map information corresponding to the acquisition section in units of levels, acquires the detailed map information from the map distribution center 2 in accordance with the determined acquisition order, combines the shape data of the acquired detailed map information and the lower-level shape data to create shape data with a higher detailedness level, and transmits the created shape data to the situation recognition unit 107.

Figure 7:
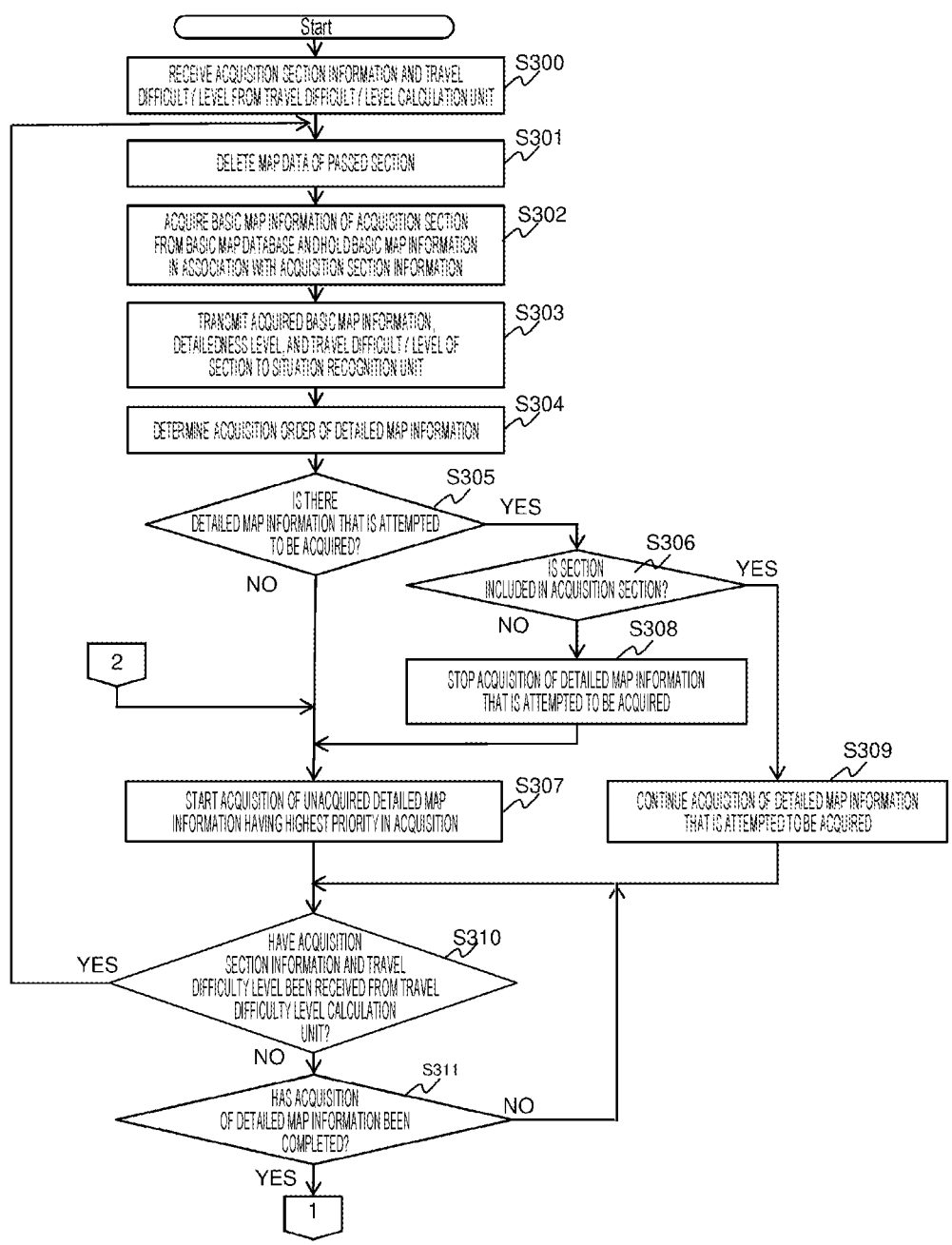
FIG. 7 is a flowchart illustrating processing performed by a map acquisition processing unit (Part 1).
Figure 8:
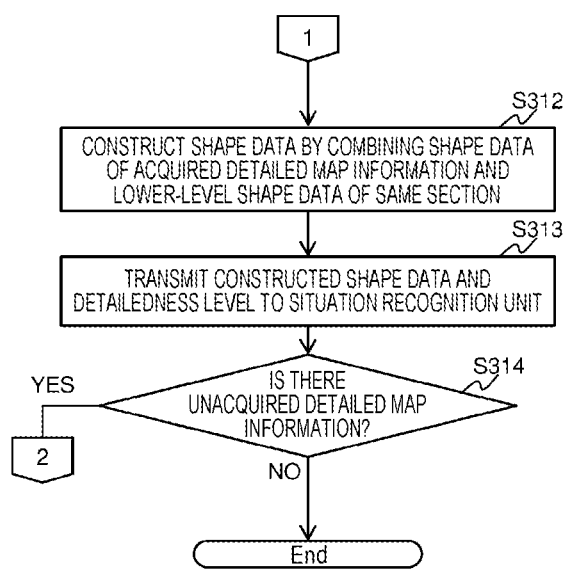
FIG. 8 is a flowchart illustrating processing performed by the map acquisition processing unit (Part 2).

FIGS. 7 and 8 are flowcharts illustrating processing performed by the map acquisition processing unit 105. The map acquisition processing unit 105 starts the processing by receiving the acquisition section information and the travel difficulty level from the travel difficulty level calculation unit 104 (S300), determines that map information of a section that is not included in the acquisition section information among the pieces of map information held by the map acquisition processing unit 105 in the acquisition section information is map information of a passed section, and deletes the map information (S301). Next, the map acquisition processing unit 105 acquires, from the basic map database 110, the basic map information of a section for which the map information is not held among the acquisition sections included in the acquisition section information, and holds the basic map information in association with the section indicated by the acquisition section information (S302). Further, the acquired basic map information, the detailedness level of the section, and the travel difficulty level of the section are transmitted to the situation recognition unit 107 (S303). Next, the map acquisition processing unit 105 determines, in units of levels, the acquisition order of the detailed map information acquired from the map distribution center 2 for the section in which the vehicle is traveling, based on the acquisition section information and the travel difficulty level received from the travel difficulty level calculation unit 104. For example, in a case where all the travel difficulty levels of the acquisition sections are the same, the acquisition order indicated by the acquisition section information is prioritized, and the lower-level detailed map information is prioritized for the same section. Further, in a case where the travel difficulty level of the section is low, it may be determined that the higher-level detailed map information corresponding to the section is not to be acquired even in a case of being able to be acquired from the map distribution center 2 (S304). After the acquisition order is determined, it is determined whether or not there is detailed map information that is attempted to be acquired from the map distribution center 2 (S305).

In a case where there is no detailed map information that is attempted to be acquired (S305; No), the map acquisition processing unit 105 notifies the map distribution center 2 of an acquisition request including target section information and a target level according to the acquisition order in units of levels, thereby starting acquisition of the detailed map information having the highest priority in acquisition (S307). On the other hand, in a case where there is detailed map information that is attempted to be acquired (S305; YES), the map acquisition processing unit 105 further determines whether or not the section of the detailed map information is included in the acquisition section at a determination time point (S306), and in a case where the section is not included (S306; No), the acquisition of the detailed map information is stopped (S308), and the acquisition of the detailed map information having the highest priority in acquisition is started (S307). On the other hand, in a case where the section of the detailed map information is included in the acquisition section at the determination time point (S306; YES), the map acquisition processing unit 105 continues acquisition of the detailed map information that is attempted to be acquired (S309). In a case where the acquisition section information and the travel difficulty level have been received from the travel difficulty level calculation unit 104 during the acquisition of the detailed map, it is determined that the vehicle 1 has entered the next section, and the processing is performed again from S301 (S310; YES). In a case where the acquisition of the detailed map information acquired in units of levels has been completed (S311; YES), the shape data of the acquired detailed map information and the held lower-level shape data of the same section are combined to construct shape data with a high detailedness level (S312). Then, the constructed shape data and the detailedness level are transmitted to the situation recognition unit 107 (S313). At this time, in a case where the acquired detailed map information includes the metadata regarding road shapes or road attributes, the metadata is also transmitted to the situation recognition unit 107. In a case where there is an unacquired detailed map after the transmission (S314; YES), the acquisition of the detailed map information having the highest priority in acquisition is started again (S307), and in a case where there is no unacquired detailed map information (S314; No), the processing ends.

The host vehicle position estimation unit 106 calculates the position of the vehicle 1 by using a GPS, a gyro sensor, and an acceleration sensor mounted on the vehicle 1, and generates the host vehicle position information indicating the position. Various formats can be used for the host vehicle position information as long as the information can specify the position, and for example, the host vehicle position information is a combination of latitude and longitude. The host vehicle position estimation unit 106 periodically notifies the acquisition section determination unit 103, the situation recognition unit 107, and the navigation device 30 of the generated host vehicle position information.

The situation recognition unit 107 integrates the host vehicle position information generated by the host vehicle position estimation unit 106, the sensor information generated by the sensor 31, and the travel route information output by the navigation device 30, periodically calculates information regarding the surrounding situation including the state of the vehicle 1, and notifies the control determination unit 108 of the information as situation recognition information. Further, when notifying the control determination unit 108 of the situation recognition information, the situation recognition unit 107 simultaneously notifies of the detailedness level of the shape data and the travel difficulty level of the section used to calculate the situation recognition information.

The control determination unit 108 uses the situation recognition information received from the situation recognition unit 107 to determine a control method for safely traveling on the route, and notifies the control operation unit 34 of the control method as operation information. In addition, the control method determined at this time is functionally limited by the detailedness level of the shape data and the travel difficulty level notified from the situation recognition unit 107, and a control mode determination table 400 and a control mode management table 500 held by the control determination unit 108.

FIG. 9 is a diagram illustrating an example of the control mode determination table 400. The control mode determination table 400 shows a control mode ID corresponding to a combination of the detailedness level of the shape data and the travel difficulty level of the section used to calculate the situation recognition information. For example, in a case where the detailedness level of the shape data used to calculate the situation recognition information is "3" and the travel difficulty level of the section is "2", the control mode ID is specified as "3".

FIG. 10 is a diagram illustrating an example of the control mode management table 500. The control mode management table 500 includes a control mode ID 501 and a control mode 502. The control mode ID 501 is an ID for uniquely specifying a control mode and corresponds to the control mode ID specified in the control mode determination table 400. The control mode 502 indicates functional limitation of the automated driving function to be set. In FIG. 10, a control mode ID "0" indicates manual driving, a control mode ID "1" indicates lane following traveling at a maximum speed of 60 km/h, a control mode ID "2" indicates lane following traveling at a maximum speed of 80 km/h, and a control mode ID "3" indicates multi-lane traveling at a maximum speed of 100 km/h. As described above, the detailedness level of the shape data and the travel difficulty level of the section used to calculate the situation recognition information, and the control mode are associated with each other, so that the automated driving function to be executed can be determined according to the detailedness level of the shape data held during traveling in the section. That is, even in a state where the entire shape data of the section cannot be used, it is possible to continue the automated driving function that can be performed with the held shape data by providing the functional limitation, and it is possible to execute the stable automated driving function according to the travel difficulty level of the section. A notification of the control mode used by the control determination unit 108 is made to the control mode notification unit 32.

The navigation device 30 has a function of calculating a travel route from the current position of the vehicle 1 to the destination based on an input of destination information by a user, and outputting, to the automated driving control device 10, a part of the travel route from the position of the host vehicle to the destination as the travel route information.

The sensor 31 is, for example, a camera, a laser radar, or the like, and has a function of periodically generating information on the surrounding of the vehicle 1 and outputting the information to the automated driving control device 10. The control mode notification unit 32 includes at least one of a liquid crystal display or a speaker. The control mode notification unit 32 notifies a user of the control mode that is being executed based on control mode information notified from the control determination unit 108. In a case where the control mode notification unit 32 notifies a user of scheduled switching to the manual driving, it is necessary to perform the manual driving by the user's own operation.

The manual control unit 33 notifies the control operation unit 34 of the operation information based on a manual operation of a steering, an accelerator, a brake pedal, or the like by a user. The control operation unit 34 operates the automated driving vehicle based on the operation information received from the control determination unit 108 and the manual control unit 33.

The map distribution center 2 includes a center communication unit 20, a map distribution processing unit 21, a dynamic information distribution processing unit 22, a map information database 23, and a dynamic information database 24. The map distribution center 2 may include a plurality of devices, or may include one computer, for example, a server device.

The center communication unit 20 is a communication module that transmits and receives data to and from the vehicle 1. The center communication unit 20 communicates with the vehicle 1 via the network 3 and the wireless base station 4.

The map distribution processing unit 21 and the dynamic information distribution processing unit 22 are implemented by a CPU, a ROM, and a RAM (not illustrated) provided in the map distribution center 2. Specifically, the map distribution processing unit 21 and the dynamic information distribution processing unit 22 implement these functions by the CPU loading a program stored in the ROM to the RAM and executing the program. However, at least one of the map distribution processing unit 21 or the dynamic information distribution processing unit 22 may be implemented by an FPGA or an ASIC instead of a combination of a CPU, a ROM, and a RAM. Furthermore, at least one of the map distribution processing unit 21 or the dynamic information distribution processing unit 22 may be implemented by a different combination, for example, a combination of a CPU, a ROM, a RAM, and an FPGA, instead of the combination of the CPU, the ROM, and the RAM.

Once an update request is received from the basic map update processing unit 102 of the automated driving control device 10, the map distribution processing unit 21 acquires update data for the basic map information stored in the basic map database 110 of the vehicle 1 from the map information database 23 and distributes the update data to the vehicle 1. Further, once an acquisition request is received from the map acquisition processing unit 105 of the automated driving control device 10, the map distribution processing unit 21 acquires the detailed map information indicated by the acquisition request from the map information database 23 and distributes the acquired detailed map information to the vehicle 1.

Once a dynamic information request is received from the dynamic information acquisition processing unit 101 of the automated driving control device 10, the dynamic information distribution processing unit 22 acquires the dynamic information stored in the dynamic information database 24, and distributes the dynamic information to the vehicle 1.

The map information database 23 and the dynamic information database 24 are databases formed in a nonvolatile storage device, for example, a hard disk drive.

The map information database 23 stores map information including connection information of roads, lanes, and the like, shape data of roads, lanes, geographic features, and the like, and metadata regarding road shapes or road attributes, for all roads on which the vehicle 1 performs automated driving. The map information database 23 may store only a base map on which the basic map information and the detailed map information are based. In this case, the map distribution processing unit 21 extracts map information of a corresponding level and section from the base map in response to the reception of the update request and the acquisition request. In addition to the base map, the map information database 23 may store map information divided for each level. In this case, the map distribution processing unit 21 selects map information of a corresponding level in response to the reception of the update request and the acquisition request, and extracts a corresponding section of the map information.

The dynamic information database 24 stores the dynamic information, which is information that dynamically changes according to a time point, such as a weather forecast, traffic congestion prediction, and a sunshine direction, and information indicating a position in the map information in association with each other.

Figure 11:
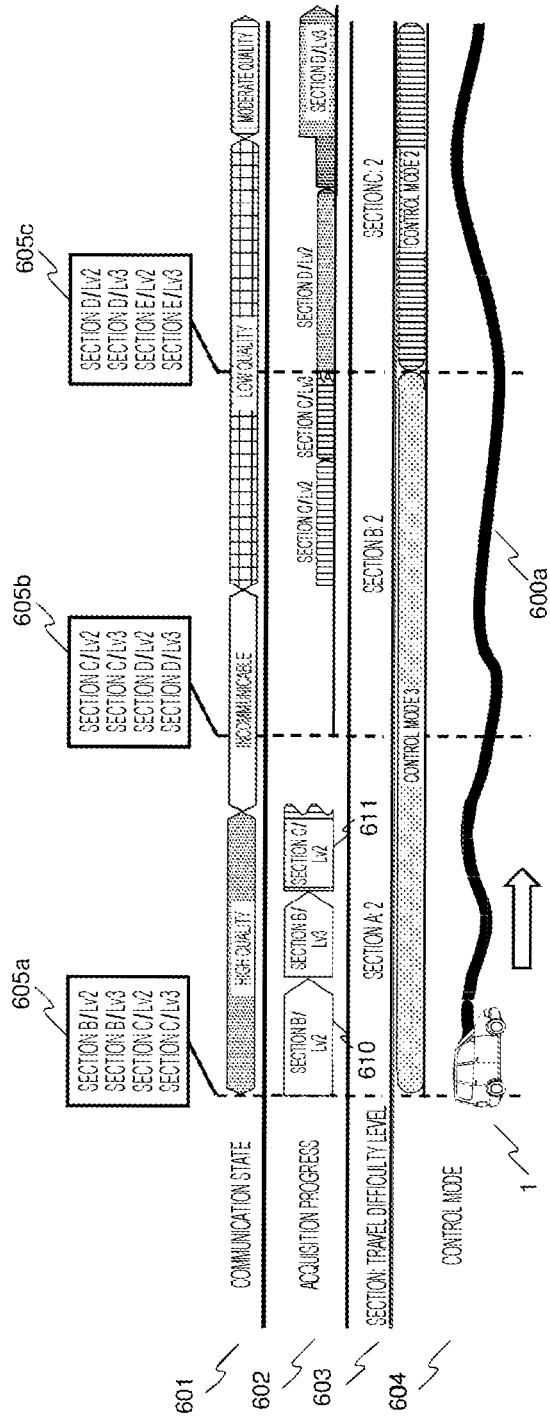
FIG. 11 is a diagram illustrating an operation example.
Figure 12:
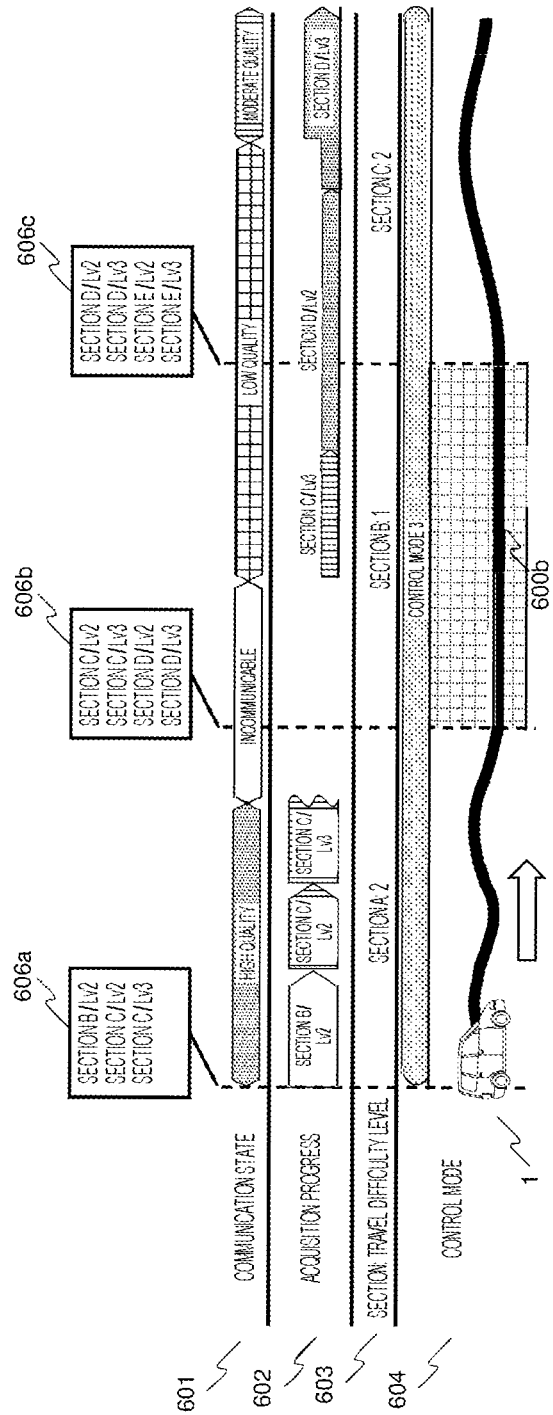
FIG. 12 is a diagram illustrating an operation example.
Figure 13:
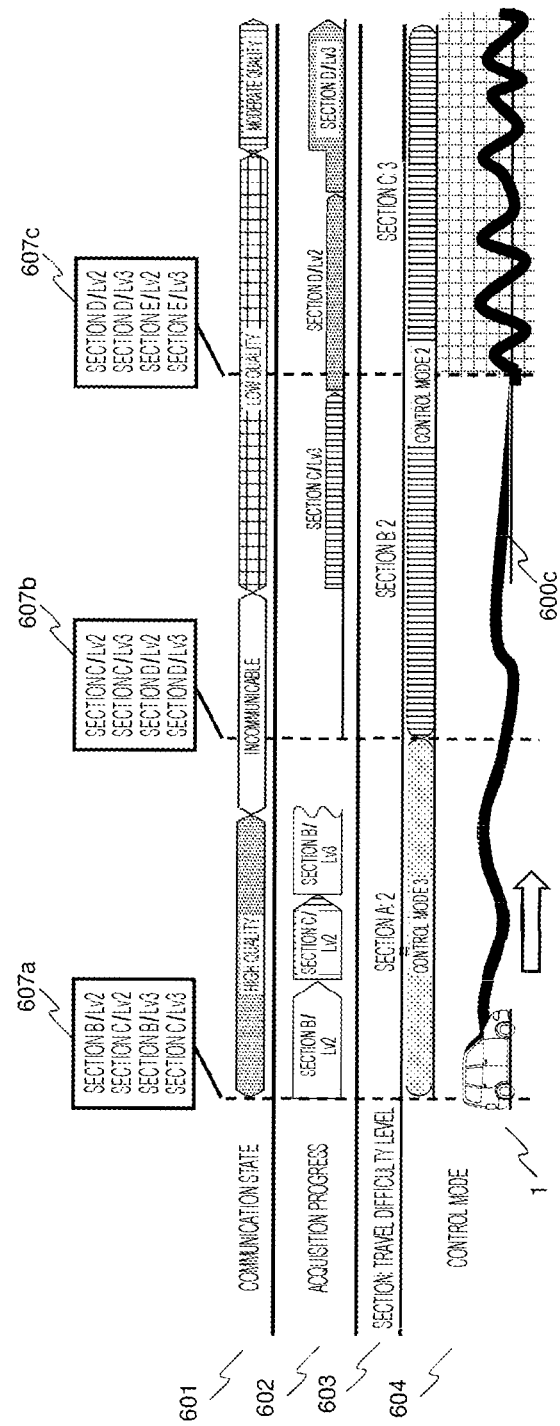
FIG. 13 is a diagram illustrating an operation example.

FIGS. 11, 12, and 13 are diagrams illustrating an operation example in the present embodiment. Specifically, FIGS. 11, 12, and 13 illustrate detailed map information acquisition order determination processing performed by the map acquisition processing unit 105, detailed map information acquisition processing, and control mode determination processing performed by the control determination unit 108.

FIG. 11 illustrates a change in acquisition section and acquisition order of the detailed map information in units of levels, a progress of acquisition of the detailed map information, a change in communication quality, and a change in control mode used for automated driving control in a case where the vehicle 1 travels on a road 600a in the order of sections A, B, and C. Items denoted by Reference Signs 601 to 604 illustrated in FIG. 11 will be described. A communication state 601 indicates a communication state at the point. An acquisition progress 602 indicates a progress of acquisition of the detailed map information. For example, a detailed map acquisition progress 610 indicates that the level-2 detailed map information of the section B is acquired, and the left end of the figure indicates the start point of acquisition and the right end of the figure indicates the completion point. The height of the figure represents the throughput of the acquisition processing that changes depending on the communication state, and the higher the height, the higher the throughput. Further, a rightmost wavy line indicated by Reference Sign 611 indicates that the acquisition has been interrupted. Section: travel difficulty level 603 indicates a section in which the vehicle 1 is traveling and the travel difficulty level, and the vehicle 1 travels rightward in the drawing. A control mode 604 represents a control mode used for automated driving control at the point. The control mode here follows the control mode determination table 400.

The operation illustrated in FIG. 11 will be described. Here, the vehicle 1 travels rightward on the road 600a. Further, Reference Signs 605a, 605b, and 605c represent the acquisition order of the detailed map information in units of levels determined by the map acquisition processing unit 105 when entering the sections A, B, and C, respectively, and represent that the detailed map information described above is preferentially acquired. First, it is assumed that the vehicle 1 has reached the start point of the section A in a state where up to level-3 detailed map information of the section A has been acquired. In this case, while traveling in the section A, the vehicle 1 uses a control mode 3 to automatically travel in a plurality of lanes at a maximum speed of 100 km/h. Further, in a case where the map acquisition processing unit 105 receives, from the travel difficulty level calculation unit 104, information indicating the section B and the section C as the acquisition section information and information indicating that each section is "2" as the travel difficulty level, the acquisition order indicated by Reference Sign 605a is determined. Here, since the travel difficulty level is 2 in both the sections B and C, the lower-level detailed map information of the section B closer to the position of the host vehicle is prioritized. According to the determined acquisition order, the level-2 detailed map information and the level-3 detailed map information of the section B, and the level-2 detailed map information of the section C are acquired. However, since the communication state becomes incommunicable during the acquisition, the acquisition of the level-2 detailed map information of the section C is interrupted.

Next, when the vehicle 1 reaches the section B, up to level-3 detailed map information has already been acquired, and thus, the use of the control mode 3 is continued. The map acquisition processing unit 105 determines the acquisition order indicated by Reference Sign 605b similarly to the section A. Then, the level-2 detailed map information and the level-3 detailed map information of the section C are acquired from a point where the communication is possible according to the determined acquisition order.

When the vehicle 1 reaches the section C, the level-2 detailed map information has already been acquired, and the level-3 detailed map information is attempted to be acquired. Therefore, a change to a control mode 2 is made, and the vehicle 1 performs automated driving in a single lane at a maximum speed of 80 km/h. The map acquisition processing unit 105 determines the acquisition order indicated by Reference Sign 605c similarly to the sections A and B. Since the section C is not included in the acquisition order determined here, the acquisition of the level-3 detailed map information of the section C is stopped, and level-2 detailed map information and level-3 detailed map information of a section D are acquired.

The operation illustrated in FIG. 12 will be described. Here, the vehicle 1 travels rightward on a road 600b. Further, Reference Signs 606a, 606b, and 606c represent the acquisition order of the detailed map information in units of levels determined by the map acquisition processing unit 105 when entering the sections A, B, and C, respectively. First, it is assumed that the vehicle 1 has reached the start point of the section A in a state where up to level-3 detailed map information of the section A has been acquired. In this case, while traveling in the section A, the vehicle 1 uses a control mode 3 to automatically travel in a plurality of lanes at a maximum speed of 100 km/h. Further, in a case where the map acquisition processing unit 105 receives, from the travel difficulty level calculation unit 104, information indicating the section B and the section C as the acquisition section information and information indicating that the section B is "1" and the section C is "2" as the travel difficulty level, the acquisition order indicated by Reference Sign 606a is determined. Here, since the travel difficulty level of the section B is 1, the use of the control mode 3 can be continued if the level-2 detailed map information is acquired. Therefore, it is determined not to include the level-3 detailed map information of the section B in the acquisition order. According to the determined acquisition order, the level-2 detailed map information of the section B, and the level-2 detailed map information and the level-3 detailed map information of the section C are acquired. However, since the communication state becomes incommunicable during the acquisition, the acquisition of the level-3 detailed map information of the section C is interrupted.

Next, when the vehicle 1 reaches the section B, up to level-2 detailed map information has already been acquired, and thus, the use of the control mode 3 is continued. The map acquisition processing unit 105 determines the acquisition order indicated by Reference Sign 606b similarly to the section A. Then, the level-3 detailed map information of the section C and the level-2 detailed map information of the section D are acquired from a point where the communication is possible according to the determined acquisition order.

Then, when the vehicle 1 reaches the section C, up to level-3 detailed map information has already been acquired, and thus, the use of the control mode 3 is continued. The map acquisition processing unit 105 determines the acquisition order indicated by Reference Sign 606c similarly to the sections A and B. Since the section D is included in the acquisition order determined here, the acquisition of the level-2 detailed map information of the section D is continued.

The operation illustrated in FIG. 13 will be described. Here, the vehicle 1 travels rightward on a road 600c. Further, Reference Signs 607a, 607b, and 607c represent the acquisition order of the detailed map information in units of levels determined by the map acquisition processing unit 105 when entering the sections A, B, and C, respectively. First, it is assumed that the vehicle 1 has reached the start point of the section A in a state where up to level-3 detailed map information of the section A has been acquired. In this case, while traveling in the section A, the vehicle 1 uses a control mode 3 to automatically travel in a plurality of lanes at a maximum speed of 100 km/h. Further, in a case where the map acquisition processing unit 105 receives, from the travel difficulty level calculation unit 104, information indicating the section B and the section C as the acquisition section information and information indicating that the section B is "2" and the section C is "3" as the travel difficulty level, the acquisition order indicated by Reference Sign 607a is determined. Here, since the travel difficulty level of the section C is 3, in a case where the level-2 detailed map information cannot be acquired, the control mode 0 is used, the automated driving is canceled, and control by the manual driving is performed. In order to avoid this, it is determined to acquire the level-2 detailed map information of the section C in preference to the level-3 detailed map information of the section B. According to the determined acquisition order, the level-2 detailed map information of the section B, the level-2 detailed map information of the section C, and the level-3 detailed map information of the section B are acquired. However, since the communication state becomes incommunicable during the acquisition, the acquisition of the level-3 detailed map information of the section B is interrupted.

Next, when the vehicle 1 reaches the section B, only up to level-2 detailed map information has been acquired, and thus, a change to the control mode 2 is made. The map acquisition processing unit 105 determines the acquisition order indicated by Reference Sign 607b similarly to the section A. Here, since the level-2 detailed map information of the section C has been acquired, the level-3 detailed map information of the section C and the level-2 detailed map information of the section D are acquired from a point where the communication state is communication is possible.

Then, when the vehicle 1 reaches the section C, up to level-3 detailed map information has already been acquired, and thus, the use of the control mode 2 is continued. The map acquisition processing unit 105 determines the acquisition order indicated by Reference Sign 607c similarly to the sections A and B. Since the section D is included in the acquisition order determined here, the acquisition of the level-2 detailed map information of the section D is continued.

According to the first embodiment described above, the following operational effects can be obtained.

The automated driving control device 10 includes: the basic map database 110 which is a storage unit that is mounted on the vehicle 1, performs automated driving control using map information, and stores basic map information including road shape data and information regarding a road; the acquisition section determination unit 103 that determines a predetermined section of the basic map information based on the position of a host vehicle; the map acquisition processing unit 105 that acquires map information including shape data that is not included in the basic map information for the section from the map distribution center 2 and generates shape data by combining the map information with the shape data included in basic map data; the situation recognition unit 107 which is a specifying unit that specifies map information corresponding to a traveling position; and the control determination unit 108 that determines a control method for the vehicle 1 at the traveling position of the vehicle 1 according to a detailedness level of the shape data included in the map information specified by the situation recognition unit 107. Therefore, the automated driving control device 10 can obtain a cost advantage by limiting the map information stored in the vehicle and reducing the required storage capacity, and can ensure the availability of the map information even in a case where the communication situation is not good.

In addition, the automated driving control device 10 includes the travel difficulty level calculation unit 104 that calculates a travel difficulty level of a section for which map information is acquired from the map distribution center 2, and the map acquisition processing unit 105 determines necessity and acquisition priority of map information to be acquired from the map distribution center 2 based on the calculated travel difficulty level. As a result, it is possible to improve the continuity of the control mode that requires detailed shape data while reducing the communication cost by avoiding acquisition of map information unnecessary for control.

As a modified example, the map acquisition processing unit 105 has, in addition to the functions described above, a function of additionally storing detailed map information in the basic map database 110 in a case where there is detailed map information already acquired for the section when the acquisition of the detailed map information corresponding to S309 of the flowchart illustrated in FIG. 7 is stopped. In a case where the acquisition of the detailed map information is stopped and there is no detailed map information acquired for the section, the map acquisition processing unit 105 registers, as information to be acquired at the time of startup, the lowest-level detailed map information that is not stored in the basic map database 110 among the pieces of detailed map information of the section, and acquires the detailed map information registered as the information to be acquired at the time of startup from the map distribution center 2 and stores the detailed map information in the basic map database 110 at the next startup of the vehicle 1.

Figure 14:
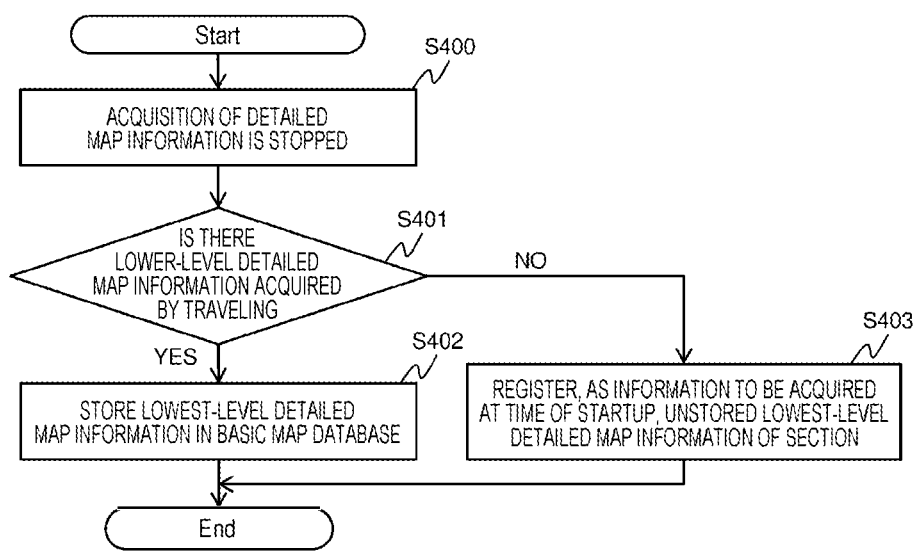
FIG. 14 is a flowchart illustrating processing performed by the map acquisition processing unit.

FIG. 14 is a flowchart illustrating addition processing performed by the map acquisition processing unit 105 in a case where the acquisition of the detailed map information is stopped. The addition processing starts when the map acquisition processing unit 105 stops acquiring the detailed map information that is attempted to be acquired from the map distribution center 2 (S400). Then, the map acquisition processing unit 105 determines whether or not there is lower-level detailed map information acquired during the traveling for the detailed map information the acquisition of which has been stopped (S401), and in case where there is lower-level detailed map information, the map acquisition processing unit 105 stores the lowest-level detailed map information among pieces of acquired lower-level detailed map information in the basic map database, and ends the processing (S402). On the other hand, in a case where there is no lower-level detailed map information, the map acquisition processing unit 105 registers the lowest-level detailed map information that is not stored in the basic map database 110 among pieces of detailed map information of the section as the information to be acquired at the time of startup, and ends the processing.

Figure 15:
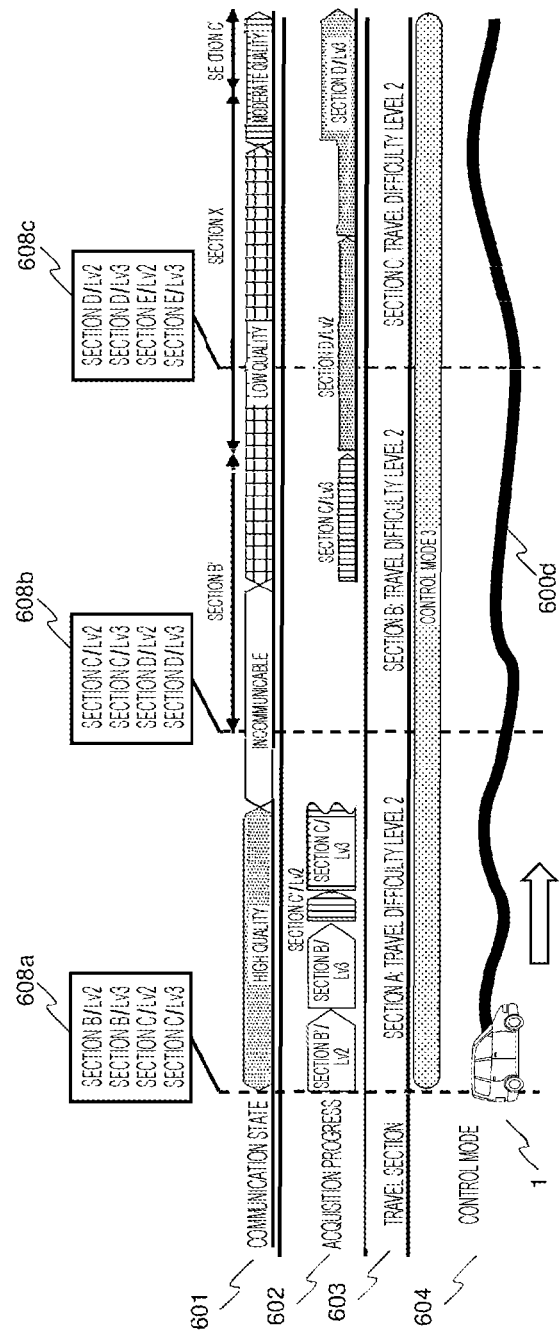
FIG. 15 is a diagram illustrating an operation example.

FIG. 15 is a diagram illustrating an operation example in a case where the present modified example is implemented. Specifically, FIG. 15 illustrates detailed map information acquisition order determination processing performed by the map acquisition processing unit 105 in a case where the detailed map information is stored for some sections of the map information stored in the basic map database 110, detailed map information acquisition processing, and control mode determination processing performed by the control determination unit 108.

FIG. 15 illustrates a change in acquisition section and acquisition order of the detailed map information in units of levels, a progress of acquisition of the detailed map information, a change in communication quality, and a change in control mode used for automated driving control in a case where the vehicle 1 travels on a road 600*d* in the order of sections A, B, and C. Items denoted by Reference Signs 601 to 604 represent the same items as described above.

The operation illustrated in FIG. 15 will be described. Here, the vehicle 1 travels rightward on the road 600*d*. Further, Reference Signs 608*a*, 608*b*, and 608*c* represent the acquisition order of the detailed map information in units of levels determined by the map acquisition processing unit 105 when entering the sections A, B, and C, respectively. In addition, it is assumed that the level-2 detailed map information is stored in the basic map database 110 in advance for a section X corresponding to parts of the sections B and C. First, it is assumed that the vehicle 1 has reached the start point of the section A in a state where up to level-3 detailed map information of the section A has been acquired. In this case, while traveling in the section A, the vehicle 1 uses a control mode 3 to automatically travel in a plurality of lanes at a maximum speed of 100 km/h. Further, in a case where the map acquisition processing unit 105 receives, from the travel difficulty level calculation unit 104, information indicating the section B and the section C as the acquisition section information and information indicating that each section is "2" as the travel difficulty level, the acquisition order indicated by Reference Sign 608*a* is determined. Here, since the travel difficulty level is 2 in both the sections B and C, the lower-level detailed map information of the section B closer to the position of the host vehicle is prioritized. The level-2 detailed map information and the level-3 detailed map information of the section B and the level-2 detailed map information and the level-3 detailed map information of the section C are acquired according to the determined acquisition order. However, since parts of the level-2 detailed map information of the section B and the level-2 detailed map information of the section C are included in the level-2 detailed map information of the section X, the acquisition sections of the level-2 detailed map information include a section B' and a section C' obtained by removing a section overlapping with the section X from the section B and the section C. However, since the communication state becomes incommunicable during the acquisition, the acquisition of the level-2 detailed map information of the section C is interrupted.

Next, when the vehicle 1 reaches the section B, up to level-3 detailed map information has already been acquired, and thus, the use of the control mode 3 is continued. The map acquisition processing unit 105 determines the acquisition order indicated by Reference Sign 608*b* similarly to the section A. Then, the level-3 detailed map information of the section C and the level-3 detailed map information of the section D are acquired from a point where the communication is possible according to the determined acquisition order.

Then, when the vehicle 1 reaches the section C, up to level-3 detailed map information has already been acquired, and thus, the use of the control mode 3 is continued. The map acquisition processing unit 105 determines the acquisition order indicated by Reference Sign 608*c* similarly to the sections A and B. Since the section D is included in the acquisition order determined here, the acquisition of the level-2 detailed map information of the section D is continued.

With the above-described addition processing, it is possible to avoid a situation in which there is a section with a regularly low communication quality and the acquisition of the detailed map information fails every time the vehicle travels on a route passing through the section.

Second Embodiment

Hereinafter, an automated driving system according to a second embodiment of the present invention will be described with reference to FIGS. 16 to 19. In the following description, the same components as those in the first embodiment are denoted by the same reference signs, and differences will be mainly described. The points that are not specifically described are the same as those in the first embodiment. The present embodiment is different from the first embodiment mainly in that the automated driving control device 10 does not calculate the travel difficulty level related to the acquisition section of the detailed map information, and the map distribution center 2 calculates the travel difficulty level and notifies the vehicle 1 of the calculated travel difficulty level.

Figure 16:
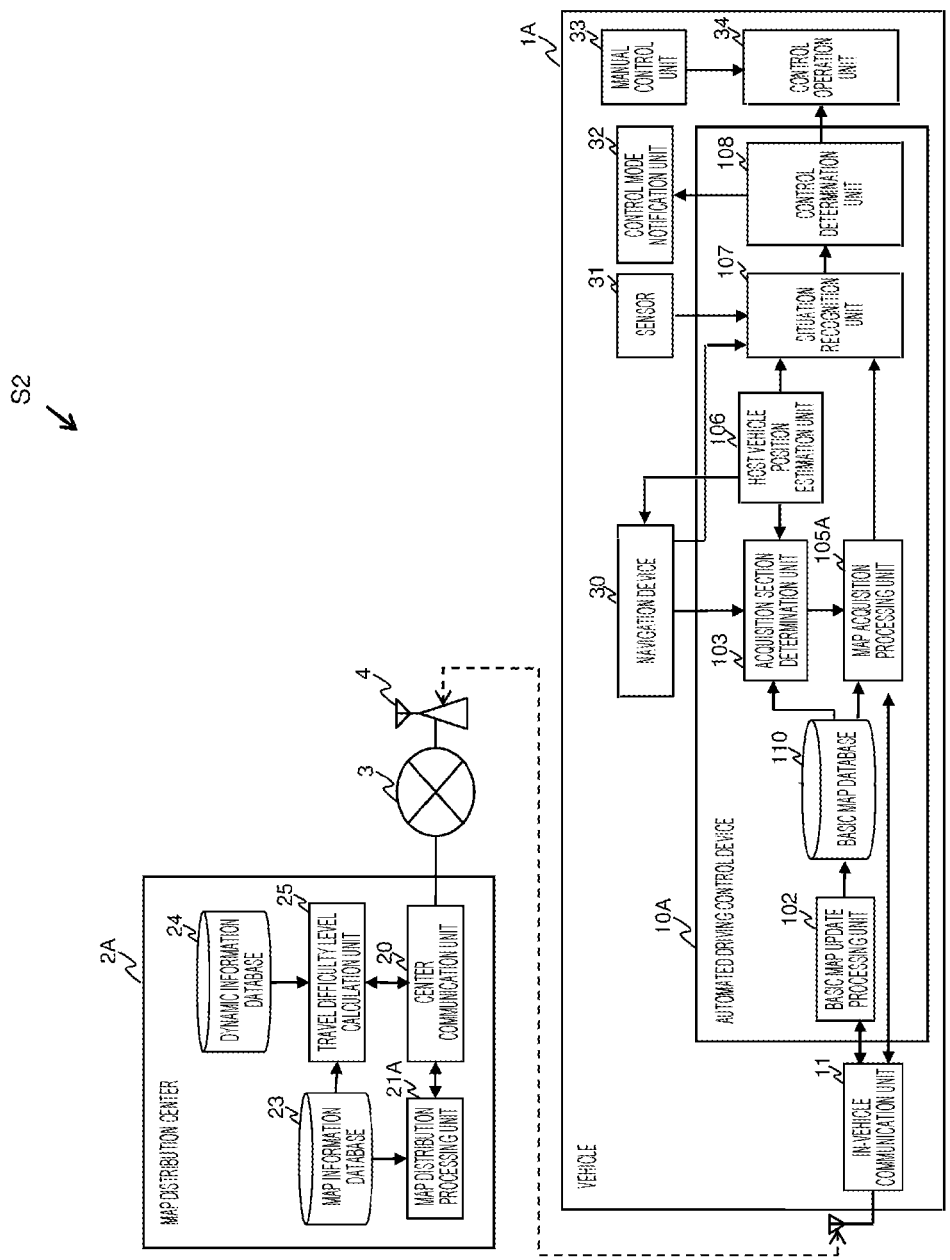
FIG. 16 is a configuration diagram of an automated driving system according to a second embodiment.

FIG. 16 is a configuration diagram of an automated driving system S2. The automated driving system S2 includes a map distribution center 2A and one or more vehicles 1A. The vehicle 1A is connected to the map distribution center 2A via a wireless base station 4 and a network 3.

The map distribution center 2A includes a center communication unit 20, a map distribution processing unit 21A, a map information database 23, a dynamic information database 24, and a travel difficulty level calculation unit 25. That is, the map distribution center 2A includes the travel difficulty level calculation unit 25 and does not include the dynamic information distribution processing unit 22 of the map distribution center 2 in the first embodiment. In addition, the map distribution center 2A includes the map distribution processing unit 21A instead of the map distribution processing unit 21.

The travel difficulty level calculation unit 25 receives a travel difficulty level request from the vehicle 1A, calculates a travel difficulty level of an acquisition section included in the travel difficulty level request, and notifies the vehicle 1A of the calculated travel difficulty level.

Figure 17:
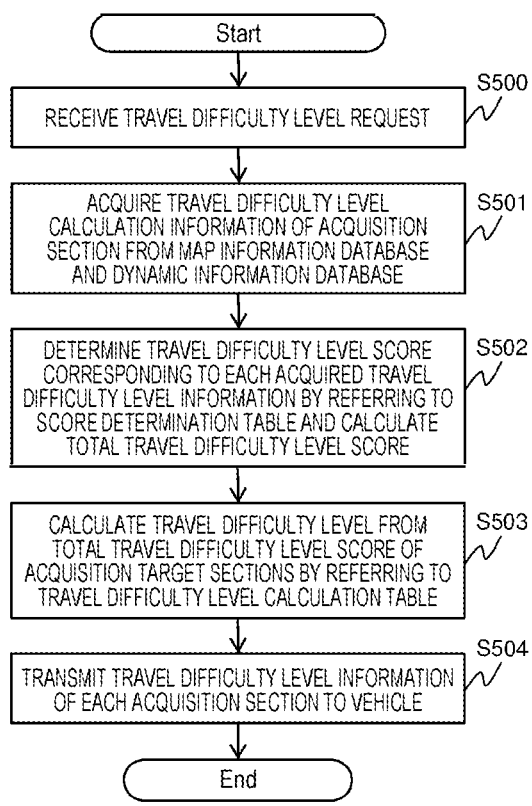
FIG. 17 is a flowchart illustrating processing performed by a travel difficulty level calculation unit.

FIG. 17 is a flowchart illustrating processing performed by the travel difficulty level calculation unit 25. Once the travel difficulty level request including acquisition section information is received from the vehicle 1A, the travel difficulty level calculation unit 25 starts the processing (S500). Once the travel difficulty level request is received, the travel difficulty level calculation unit 25 acquires travel difficulty level information corresponding to the acquisition section from the map information database 23 and the dynamic information database 24 by referring to the acquisition section information (S501). Then, the travel difficulty level calculation unit 25 determines a travel difficulty level score by referring to a score determination table that is held by the travel difficulty level calculation unit 25 and indicates the travel difficulty level score according to the travel difficulty level information, based on the acquired travel difficulty level information, and calculates the total travel difficulty level score (S502). Next, the travel difficulty level calculation unit 25 calculates the travel difficulty level of the section by referring to a travel difficulty level calculation table that is held by the travel difficulty level calculation unit 25 and indicates the travel difficulty level corresponding to the total travel difficulty level score based on the total travel difficulty level score (S503). The travel difficulty level calculation unit 25 transmits the travel difficulty level information including the calculated travel difficulty level of each acquisition section to the map acquisition processing unit 105 of the vehicle 1A that has transmitted the travel difficulty level request, and ends the processing (S504).

The vehicle 1A includes an automated driving control device 10A, an in-vehicle communication unit 11, a navigation device 30, a sensor 31, a control mode notification unit 32, a manual control unit 33, and a control operation unit 34. The automated driving control device 10A includes a basic map update processing unit 102, an acquisition section determination unit 103, a map acquisition processing unit 105A, a host vehicle position estimation unit 106, a situation recognition unit 107, a control determination unit 108, and a basic map database 110. That is, the vehicle 1A does not include the dynamic information acquisition processing unit 101, the travel difficulty level calculation unit 104, and the dynamic information database 109 of the vehicle 1 in the first embodiment. In addition, the vehicle 1A includes the map acquisition processing unit 105A instead of the map acquisition processing unit 105.

Once the acquisition section information is received from the acquisition section determination unit 103, the map acquisition processing unit 105A transmits the travel difficulty level request including the acquisition section to the map distribution center 2A, thereby acquiring the travel difficulty level of each acquisition section. In addition, the map acquisition processing unit 105A acquires basic map information of each acquisition section from the basic map database 110, holds the acquired basic map information, and transmits the basic map information to the situation recognition unit 107. Further, the map acquisition processing unit 105A determines the acquisition order of the detailed map information corresponding to the acquisition section in units of levels, acquires the detailed map information from the map distribution center 2A in accordance with the determined acquisition order, combines the shape data of the acquired detailed map information and the lower-level shape data to create shape data with a higher detailedness level, and transmits the created shape data to the situation recognition unit 107.

Figure 18:
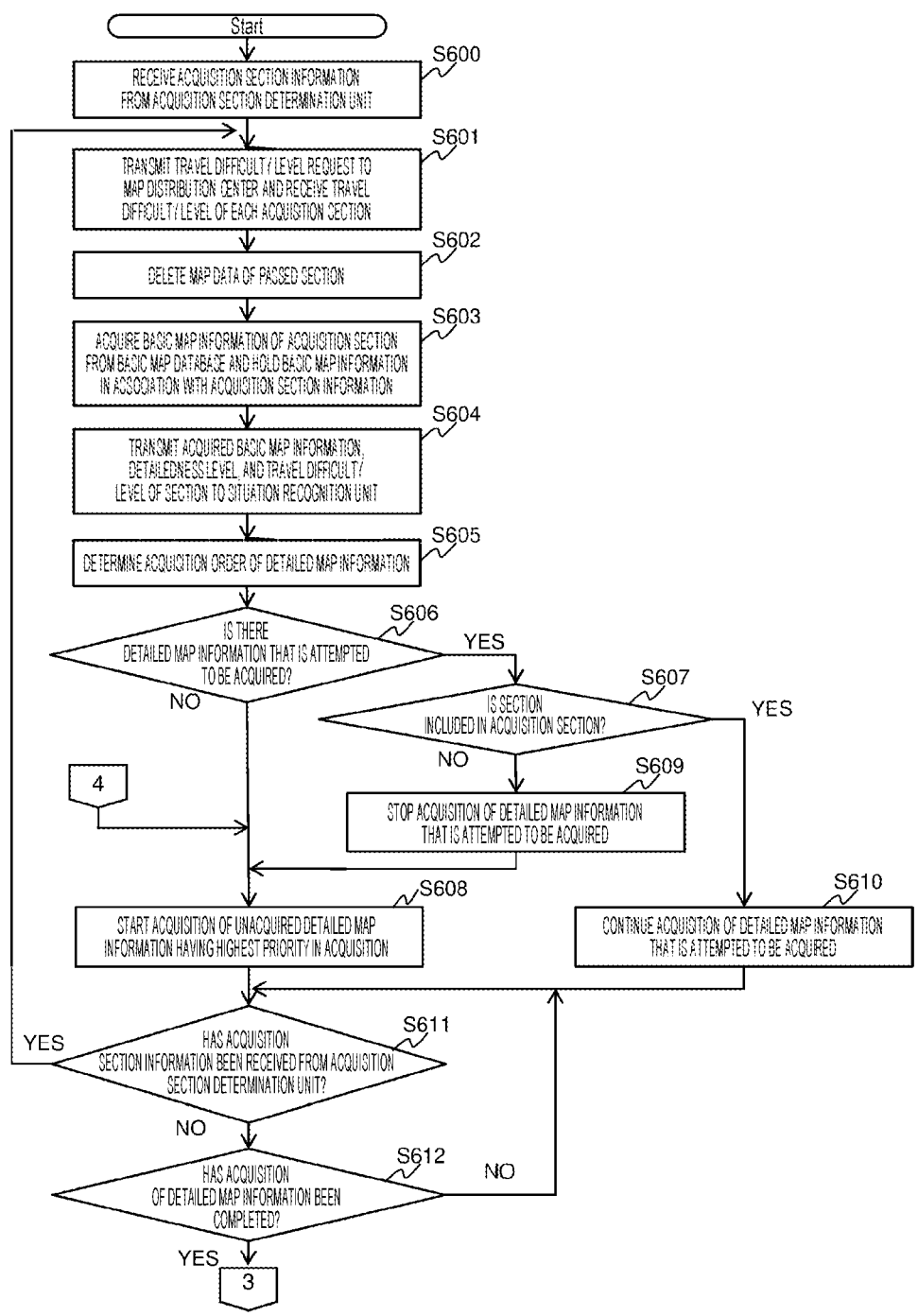
FIG. 18 is a flowchart illustrating processing performed by a map acquisition processing unit (Part 1).
Figure 19:
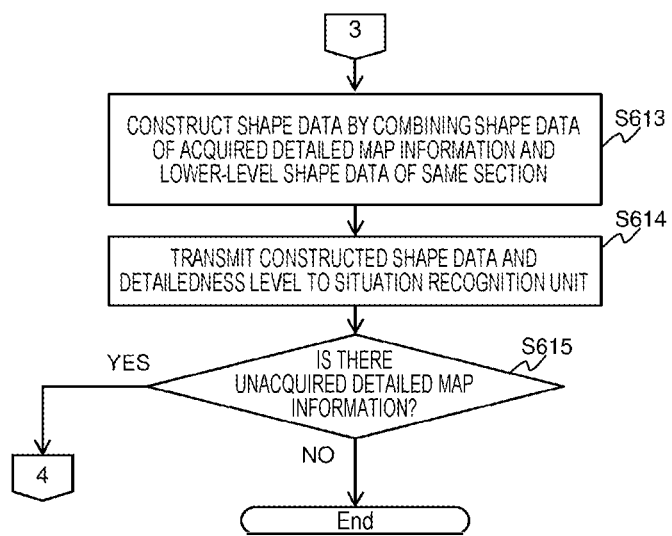
FIG. 19 is a flowchart illustrating processing performed by the map acquisition processing unit (Part 2).

FIGS. 18 and 19 are flowcharts illustrating processing performed by the map acquisition processing unit 105A. The map acquisition processing unit 105A starts the processing when the acquisition section information is received from the acquisition section determination unit 103 (S600), transmits the travel difficulty level request including the acquisition section included in the acquisition section information to the map distribution center 2A, and receives the travel difficulty level of each acquisition section (S601). Next, the map acquisition processing unit 105A determines that map information of a section that is not included in the acquisition section information among the pieces of map information held by the map acquisition processing unit 105A is map information of a passed section, and deletes the map information (S602). Then, the map acquisition processing unit 105A acquires, from the basic map database 110, the basic map information of a section for which the map information is not held among the acquisition sections included in the acquisition section information, and holds the basic map information in association with the section indicated by the acquisition section information (S603). Further, the acquired basic map information, the detailedness level of the section, and the travel difficulty level of the section are transmitted to the situation recognition unit 107 (S604). Next, the map acquisition processing unit 105A determines, in units of levels, the acquisition order of the detailed map information acquired from the map distribution center 2A for the section in which the vehicle is traveling, based on the acquisition section information received from the acquisition section determination unit 103 and the travel difficulty level received from the map distribution center 2A (S605). After the acquisition order is determined, it is determined whether or not there is detailed map information that is attempted to be acquired from the map distribution center 2A (S606). In a case where there is no detailed map information that is attempted to be acquired (S606; NO), the map acquisition processing unit 105A notifies the map distribution center 2A of an acquisition request including target section information and a target level according to the acquisition order in units of levels, thereby starting acquisition of the detailed map information having the highest priority in acquisition (S608). On the other hand, in a case where there is detailed map information that is attempted to be acquired (S606; YES), the map acquisition processing unit 105A further determines whether or not the section of the detailed map information is included in the acquisition section at a determination time point (S607), and in a case where the section is not included (S607; NO), the acquisition of the detailed map information is stopped (S609), and the acquisition of the detailed map information having the highest priority in acquisition is started (S608). On the other hand, in a case where the section of the detailed map information is included in the acquisition section at the determination time point (S607; YES), the map acquisition processing unit 105A continues acquisition of the detailed map information that is attempted to be acquired (S610). In a case where the acquisition section information has been received from the acquisition section determination unit 103 during the acquisition of the detailed map, it is determined that the vehicle 1A has entered the next section, and the processing is performed again from S601 (S611; YES). In a case where the acquisition of the detailed map information acquired in units of levels has been completed (S612; YES), the shape data of the acquired detailed map information and the held lower-level shape data of the same section are combined to construct shape data with a high detailedness level (S613). Then, the constructed shape data and the detailedness level are transmitted to the situation recognition unit 107 (S614). At this time, in a case where the acquired detailed map information includes the metadata regarding road shapes or road attributes, the metadata is also transmitted to the situation recognition unit 107. In a case where there is an unacquired detailed map after the transmission (S615; YES), the acquisition of the detailed map information having the highest priority in acquisition is started again (S608), and in a case where there is no unacquired detailed map information (S615; NO), the processing ends.

In each of the above-described embodiments and modified examples, the components of the functional blocks are merely an example. Some functional components illustrated as separate functional blocks may be integrally implemented, or a component illustrated in one functional block diagram may be divided into two or more functions. In addition, some of the functions of each functional block may be included in another functional block.

In addition, the control mode described in each of the above-described embodiments is merely an example, and can be appropriately changed and implemented. For example, forward vehicle following, in which the host vehicle automatically follows a vehicle traveling in the same lane ahead of the host vehicle, may be included as one aspect of the automated driving control.

In the above-described embodiments and modified examples, the program of the automated driving control device 10 is stored in the ROM (not illustrated), but the program may also be stored in a nonvolatile storage region. In addition, the automated driving control device 10 may include an input/output interface (not illustrated), and the program may be read from another device via a medium that can be used by the input/output interface and the automated driving control device 10 when necessary. Here, the medium refers to, for example, a storage medium detachable from the input/output interface, or a communication medium, that is, a network such as a wired network, a wireless network, or an optical network, or a carrier signal or digital signal propagating through the network. Some or all of the functions implemented by the program may be implemented by a hardware circuit or an FPGA.

The above-described embodiments and modified examples may be combined. Although various embodiments and modified examples have been described above, the present invention is not limited to contents thereof. Other aspects conceivable within the scope of the technical idea of the present invention also fall within the scope of the present invention.

REFERENCE SIGNS LIST 1 vehicle
2 map distribution center
10 automated driving control device
11 in-vehicle communication unit
20 center communication unit
21 map distribution processing unit
22 dynamic information distribution processing unit
23 map information database
24 dynamic information database
25 travel difficulty level calculation unit
30 navigation device
31 sensor
32 control mode notification unit
33 manual control unit
34 control operation unit
101 dynamic information acquisition processing unit
102 basic map update processing unit
103 acquisition section determination unit
104 travel difficulty level calculation unit
105 map acquisition processing unit
106 host vehicle position estimation unit
107 situation recognition unit
108 control determination unit
109 dynamic information database
110 basic map database
100 map distribution plan information
200 score determination table
300 travel difficulty level calculation table
400 control mode determination table
500 control mode management table

The invention claimed is:

1. An electronic control apparatus that is mounted on a vehicle and performs automated driving control using map information, the electronic control apparatus comprising:
a storage apparatus that stores basic map data;
a communication apparatus that communicates with a data center to acquire map data managed by the data center as external map data; and
a processing apparatus that determines a control mode of the automated driving control according to the acquired external map data and performs the automated driving control based on the determined control mode, position information of the vehicle, the basic map data, and the external map data, wherein
the map information includes shape data of at least one of a road, a lane, or a geographic feature,
the map information is divided into a plurality of levels based on different detailedness level of the shape data,
the basic map information includes shape data corresponding to, among the plurality of levels, the level with the lowest detailedness level,
the external map information includes shape data corresponding to, among the plurality of levels, each of one or more levels with higher detailedness level compared to the basic map information, and
the processing apparatus determines, based on the level of the shape data included in the external map information acquired by the communication apparatus, one of the plurality of control modes with different control methods of the vehicle as the control mode of the autonomous driving control.

2. The electronic control apparatus according to claim 1, wherein
the external map data includes shape data of at least one of a road, a lane, or a geographic feature,
the storage apparatus stores control mode determination data in which a detailedness level of the shape data and the control mode are associated with each other, and the processing apparatus determines a predetermined section of the basic map data based on the position information, acquires shape data for supplementing the basic map data for the section from the data center, and combines the shape data with the basic map data to generate usable shape data, and determines the control mode of the automated driving control for the section based on the control mode determination data corresponding to the detailedness level of the usable shape data and performs the automated driving control in the section in the determined control mode.

3. The electronic control apparatus according to claim 2, wherein
the storage apparatus stores the control mode determination data in which a travel difficulty level of the predetermined section of the basic map data is further associated with the detailedness level of the shape data and the control mode, the travel difficulty level being determined using at least one of a shape of the road, information regarding the road, or surrounding environment information of the vehicle, and
the processing apparatus determines the control mode of the automated driving control for the section based on the control mode determination data corresponding to a combination of the detailedness level of the usable shape data and the travel difficulty level, and performs the automated driving control in the section in the determined control mode.

4. The electronic control apparatus according to claim 2, wherein the processing apparatus determines necessity and priority of acquisition of the shape data for supplementing the basic map data based on a travel difficulty level of the predetermined section of the basic map data determined using at least one of a shape of the road, information regarding the road, or surrounding environment information of the vehicle, and acquires the shape data from the data center.

5. The electronic control apparatus according to claim 3, wherein the processing apparatus further performs processing of determining the travel difficulty level.

6. The electronic control apparatus according to claim 3, wherein the processing apparatus acquires the travel difficulty level from the data center and uses the travel difficulty level.

7. The electronic control apparatus according to claim 2, wherein the processing apparatus stores the shape data for supplementing the basic map data in the storage apparatus in a case where the acquisition of the shape data for supplementing the basic map data for the predetermined section of the basic map data is interrupted.

8. A control method executed by an electronic control apparatus that is mounted on a vehicle and performs automated driving control using map information, the control method comprising:
communicating, by the electronic control apparatus, with a data center to acquire map data managed by the data center as external map data;
determining, by the electronic control apparatus, a control mode of the automated driving control according to the acquired external map data; and
performing, by the electronic control apparatus, the automated driving control based on the determined control mode, position information of the vehicle, basic map data stored in a storage apparatus of the electronic control apparatus, and the external map data, wherein
the map information includes shape data of at least one of a road, a lane, or a geographic feature,
the map information is divided into a plurality of levels based on different detailedness level of the shape data,
the basic map information includes shape data corresponding to, among the plurality of levels, the level with the lowest detailedness level,
the external map information includes shape data corresponding to, among the plurality of levels, each of one or more levels with higher detailedness level compared to the basic map information, and
the processing apparatus determines, based on the level of the shape data included in the external map information acquired by the communication apparatus, one of the plurality of control modes with different control methods of the vehicle as the control mode of the autonomous driving control.

9. An automated driving system comprising:
an electronic control apparatus that is mounted on a vehicle and performs automated driving control using map information; and
a data center that communicates with the electronic control apparatus via wireless communication,
wherein the electronic control apparatus includes:
a storage apparatus that stores basic map data;
a communication apparatus that communicates with the data center to acquire map data managed by the data center as external map data; and
a processing apparatus that determines a control mode of the automated driving control according to the acquired external map data and performs the automated driving control based on the determined control mode, position information of the vehicle, the basic map data, and the external map data, wherein
the map information includes shape data of at least one of a road, a lane, or a geographic feature,
the map information is divided into a plurality of levels based on different detailedness level of the shape data,
the basic map information includes shape data corresponding to, among the plurality of levels, the level with the lowest detailedness level,
the external map information includes shape data corresponding to, among the plurality of levels, each of one or more levels with higher detailedness level compared to the basic map information, and
the processing apparatus determines, based on the level of the shape data included in the external map information acquired by the communication apparatus, one of the plurality of control modes with different control methods of the vehicle as the control mode of the autonomous driving control.

* * * * *